Jan. 15, 1963     C. RIPARBELLI     3,073,494
MISSILE SHELL
Filed Jan. 2, 1959

INVENTOR.
CARLO RIPARBELLI
BY
ATTORNEY

United States Patent Office 3,073,494
Patented Jan. 15, 1963

3,073,494
MISSILE SHELL
Carlo Riparbelli, San Diego, Calif., assignor to General Dynamics Corporation, San Diego, Calif., a corporation of Delaware
Filed Jan. 2, 1959, Ser. No. 784,614
4 Claims. (Cl. 244—119)

This invention relates to missile shells and in particular to missile shells constructed to withstand axial thrust due to the propulsion system, mass and aerodynamic forces.

In long range missile design, structures are desired having a high strength to weight ratio so that the empty weight of the missile can be kept at a minimum without sacrificing the necessary strength. In order to determine the parameters of the structure involved it must first be determined the forces to which the missile is to be subjected. For example, with rocket motors in the tail section for driving the missile forward and with high speed compression of air against the nose section, the missile structure is primarily subjected to axial compression, although other forces such as bending, shear, torsion and other factors must be considered. When compression forces are applied to a hollow cylindrical thin walled object such as an ordinary empty tin can, for example, the buckling, twisting and crushing effect of the wall elements is readily noted. A missile shell is subject to the same kind of forces and must therefore be constructed to withstand them in order to accomplish its mission. Many thin walled missile shells undergoing axial compression are stablized by the pressure of the fuel contained therein. In many cases the pressure would be sufficient for this purpose, but it cannot be relied upon because of possible leakages. Previously, rigid preformed panel members or structural parts have been used which do not have the necessary elasticity of construction to absorb the compressional forces without failure of the part when a compression has deformed the part to a certain degree. Thus, when the compressive force is removed, the damage is permanent and the structure has failed. In such construction, to make the part stronger the weight must be increased which adversely affects the strength to weight ratio. The present invention incorporates the principle of pre-cambering (or precurving) a part in a certain direction, so that upon application of the axial load the part will be curved more into the same pre-established direction, and thereafter will provide a means to prevent collapse in that direction. In an exemplary embodiment a hollow cylindrical wall comprises a skin and is bowed outwardly at its mid-section so that upon compression the wall will bulge outwardly. The wall however is braced by its own continuity in the hoop direction so that further outward bowing and resultant structural failure is prevented. The structure is so designed that the curvatures never reverse during load. The loopwise tension in the wall or skin arising when an axial compressive load is applied to the described structure is essential to its function.

It is therefore an object of this invention to provide for an improved high strength to weight ratio structural member.

Another object is the provision of an improved missile shell designed to withstand high axial compressive forces.

Another object is the provision of a pre-chambered shell in which the curvatures are proportioned to the forces acting in the longitudinal and hoop directions, wherein compressional forces will distort the structural members in a pre-determined direction and the hoop skin tension is used to prevent this distortion.

Other objects and features of the present invention will be readily apparent to those skilled in the art from the following specification and appended drawings wherein is illustrated a preferred form of the invention, and in which.

Figure 1:
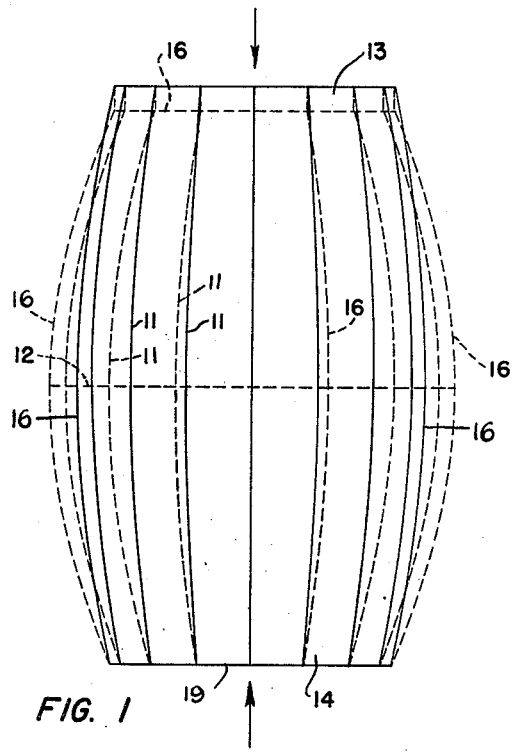
FIGURE 1 is a schematic indication of the deformation made of the barrel shaped shell under axial thrust.

Referring now to FIGURE 1 the solid lines 11 represent the stringers with their initial curvature comprising a barrel shaped structural housing. This housing has a somewhat larger circumference about its mid-section 12 than about its end sections 13 and 14. A skin 16, shown in profile in FIGURE 1 and further illustrated in FIGURE 3, is positioned outwardly of the housing and secured thereto to sustain the aforementioned hoop stresses.

As compressional forces are applied against the top and bottom end sections 13 and 14, each stringer has a tendency to bow outwardly assuming the broken line positions indicated, much in the same manner as when an archer strings his bow preparatory to shooting his arrows. As compression forces are applied the housing (or skin) 16 is forced to stretch hoopwise. Thus it bulges outwardy and it shortens somewhat in length as shown by the dashed lines 16. It is noted that due to the initial curvature of the stringers in the barrel-like configuration, there is no reversal of curvature, twisting, buckling or other distortion other than the outward bulging tendency of the frame members, until the stresses reach a sufficiently high level for local collapse. In other words the instability of longitudinal stringers is not present in the barrel shaped design.

Figure 2:
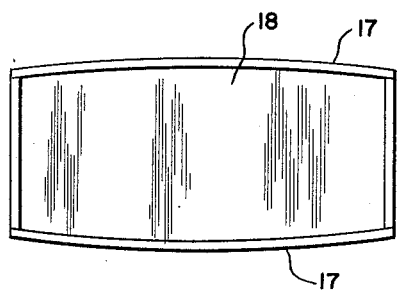
FIGURE 2 shows a plane panel with two cambered stringers carrying axial compression and a thin web conveying transversal tension.

Having accomplished the predetermined compressional direction of the stringers deformation, it becomes necessary to restrain the extent of deformation. This may be done by making the skin 16 of skin panels covering the stringers and being secured thereto continuously or at various points. Thus a skin panel between oppositely bowed stringers will limit their outward bowing under compression to the stretchability or elasticity of the panel. A similar action is exemplified in FIGURE 2 for a plane or flat panel wherein are shown outwardly curved stringers 17 with a thin planar web 18 stretched between them. This web functions, as does the skin mentioned above, in limiting the outward bowing of the stringers 17 when axial compressive forces are exerted upon the panel.

Figure 4:
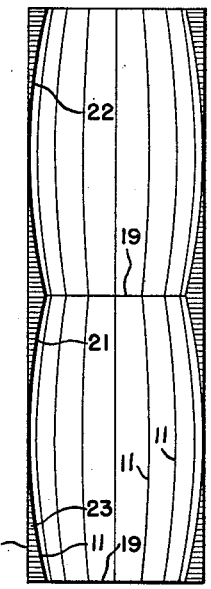
FIGURE 4 is a longitudinal sectional view of barrel curved framework with a cylindrical outer skin.
Figure 3:
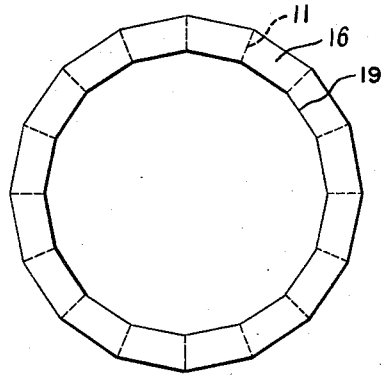
FIGURE 3 is an end view of a barrel shaped shell.

FIGURE 3 is an end view of the barrel-like configuration of FIGURE 1 showing a polygonal end member 19 in which stringers 11 terminate. The skin panels comprising skin 16 extend longitudinally between adjacent frame members to exert a hoop tension to prevent reversal of curvature of the stringers and to prevent bowing beyond prescribed limits. FIGURE 4 is an example of how the pre-curved stringer principle may be used with an outer cylindrical skin or where the length of the missile is such that two or more sets of curved stringers are required. Here two barrel frames 21 and 22 are mounted in end to end relationship. Spacers 23 extend between the stringers and the cylindrical skin wall 24 to maintain the wall with a uniform diameter.

The barrel design lends itself to a mathematical determination of an optimum shape for a structure apt to transmit a given compressive force between two points specified at a given distance. Other loading conditions however may enter the design, such as reversal of the load, bending, shear and torsion.

The skin thickness, as well as the stringers section, bending stiffness and initial curvature may be varied along the axis direction to fulfill the desired design condition providing the curvature of the stringers will not be reversed at any point when the load is applied. The stringers ends may be hinged or partially restrained against rotation for the same purpose.

The stringers do not need to be individual elements separate from the skin as described above but the whole structure may consist of a single shell having double curvature so designed that the wall undergoing longitudinal compression will be stabilized by the hoopwise tension.

While certain preferred embodiments of the invention have been specifically disclosed, it is understood that the invention is not limited thereto as many variations will be readily apparent to those skilled in the art and the invention is to be given its broadest possible interpretation within the terms of the following claims.

I claim:

1. A barrel shaped missile shell having an axial compression resistant frame comprising a plurality of outwardly bowed longitudinally extending stringers forming a cylindrical configuration with a midsection of larger diameter than the ends thereof, said stringers being flexible and free for movement relative to each other along their longitudinal margins and having a tendency to flex and bow further outwardly under axial compressional forces, means resisting further outwardly directed deformation of said stringers comprising web members interconnecting said longitudinal stringers throughout the stringer length, said web members having tension resisting strength to resist lateral movement between said longitudinal stringers, thereby resisting longitudinal compressional forces on said frame.

2. A barrel shaped missile shell having an axial compression resistant frame comprising a plurality of outwardly bowed longitudinally extending flexible stringers forming a cylindrical configuration with a midsection of larger diameter than the ends thereof, said stringers being free for movement relative to each other along their longitudinal margins and having a tendency to flex and bow further outwardly under axial compressional forces, means resisting further outwardly directed deformation of said stringers comprising skin panel members interconnecting adjacent stringers throughout the stringer length, said panel members having tension resisting strength throughout the frame length to resist lateral movement between said stringers, thereby resisting longitudinal compressional forces on said frame.

3. A barrel shaped missile shell having an axial compression resistant frame comprising a plurality of outwardly bowed longitudinally extending stringers forming a first cylindrical configuration with a midsection of larger diameter than the ends thereof, said stringers being free for movement relative to each other along their longitudinal margins and having a tendency to bow further outwardly under axial compressional forces, a second cylindrical configuration similarly constructed and axially connected to said first configuration, spacers attached at closely spaced intervals to said stringers and extending outwardly therefrom to present a uniform outer diameter along the length of said frame, means resisting further outwardly directed deformation of said stringers comprising skin panel members interconnecting said stringers and spacers, said panel members having tension resisting strength to resist lateral movement between said stringers, thereby resisting longitudinal compressional forces on said frame.

4. An axial compression resistant high strength to weight ratio structural frame panel comprising a pair of spaced outwardly bowed flexible stringers extending axially in the direction of expected compressional forces, and a web extending between and interconnecting said stringers throughout the stringer length, said web having a tensile strength to resist further outward bowing and flexure of said stringers when axial compressive forces are applied.

References Cited in the file of this patent

UNITED STATES PATENTS

| | | |
|---|---|---|
| 1,930,285 | Robinson | Oct. 10, 1933 |
| 2,538,682 | Gramelspacher | Jan. 16, 1951 |
| 2,817,484 | Stenzel | Dec. 24, 1957 |